Dec. 22, 1953  R. PAILLET  2,663,750
FLAT CELL ELECTRIC BATTERY
Filed June 27, 1952  2 Sheets-Sheet 1

Inventor
Robert Paillet
By
Shenderoth, Lind + Ponack
Attorneys.

Dec. 22, 1953   R. PAILLET   2,663,750
FLAT CELL ELECTRIC BATTERY
Filed June 27, 1952   2 Sheets-Sheet 2

Inventor
Robert Paillet
By
Henderoth, Lind & Ponack
Attorneys.

Patented Dec. 22, 1953

2,663,750

UNITED STATES PATENT OFFICE 2,663,750

FLAT CELL ELECTRIC BATTERY

Robert Paillet, Paris, France, assignor to Société Anonyme dite: Societe des Piles Wonder, Saint-Ouen (Seine), France Application June 27, 1952, Serial No. 295,954

Claims priority, application France April 7, 1952

2 Claims. (Cl. 136—111)

A great many embodiments of electric batteries of the so-called flat-cell type are known in which each cell includes a 2-pole electrode constituted by a metal blank one single side of which is coated with an electrolyte-impervious conductive carbonaceous material, said electrode thus constituting at its one side the anode of the battery cell and at its opposite side the cathode of the next battery element.

In the U. S. Patent No. 2,591,355 a battery of that kind is described in which it is possible to separately test the said cells by establishing a contact between the sides of the successive zinc anodes.

The purpose of my invention is to provide an improvement of this construction of the prior art, which will exhibit certain advantages in addition to the results already achieved according to the aforesaid patent, these new features and advantages being set forth hereinafter.

An object of my invention is to construct a dry battery, the cells of which are contained in one single frame which is constructed to provide a support for the various parts of the cell and moreover to preclude any accidental short-circuit consequent to the oozing out of electrolyte.

A further object of my invention is to construct a battery cell in which the various component parts can be assembled quite rapidly simply by boxing them in one another.

A further object of my invention is to provide a reliable seal by which the anode is effectively protected from any contact with the depolarizer.

Still a further object of my invention is to provide a dry battery which is capable of supplying a current of higher intensity than those of comparable size known heretofore, and this, without the risk of deterioration.

Additional purposes and features of my invention will be set forth in the following specification in which reference is had to the drawing appended hereto, wherein.

Figure 1:
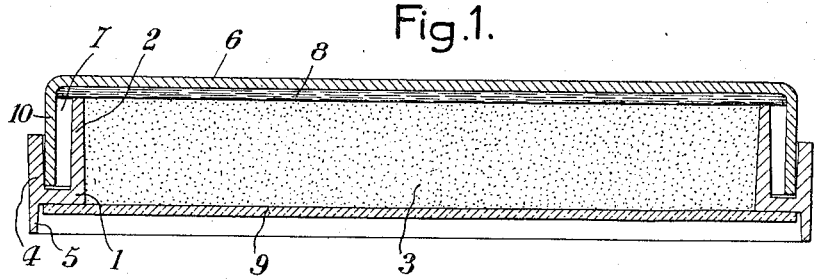
Figure 1 is a cross-sectional view of a cell of a battery according to my invention.
Figure 2:
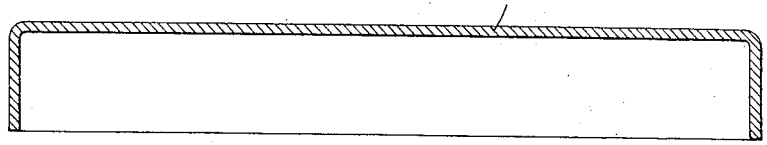
Figures 2 and 3 show the zinc anode in cross-sectional and plan view respectively.
Figure 3:
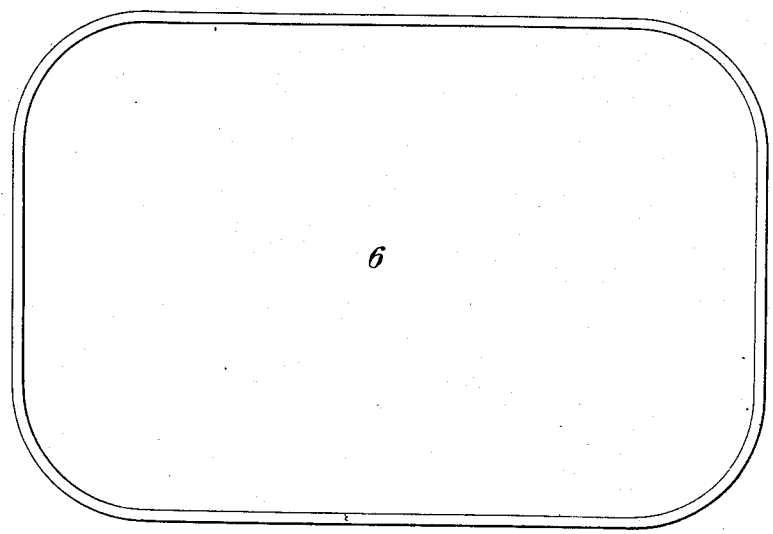
Figure 4:
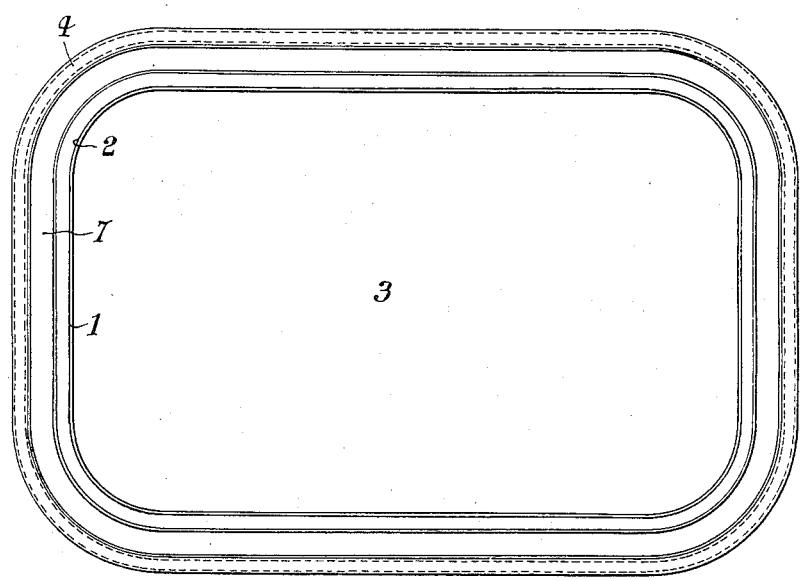
Figure 4 is a plan view of the annular trough designed to collect the electrolyte in the event same should happen to ooze out accidentally.

The battery cell comprises a frame 1 made of a thermoplastic material formed with a pair of parallel flanges 2, 4 between which a circumferential trough is delimited which in turn delimits a space 3 in which an agglomerated depolarizing mass is enclosed. The flange 2 of the frame 1 limits the said space 3 laterally and is in contact with the said agglomerated mass. The height of the companion flange 4 of the trough, i. e. of the one which provides the outside of the frame 1, is less than that of the flange 4. The said flange 4 extends below the bottom of the trough in a further flange 5 adapted to cap the top of the battery cell next below.

The zinc anode 6 is shaped as an inverted cup the flange 10 of which is received in the trough and exactly fits the outer flange 4 of the same. In this manner, the said flange 10 of anode 6 remains clear of the flange 2 of frame 1, whereby a free peripheral space 7 is left in the frame 1.

A paper sheet 8 cut to the inner dimensions of the zinc cup 6 is laid on the bottom of the latter, after which said sheet 8 is laid perfectly flat on top of the mass of depolarizing material as well as on the top edge of the flange 2 where it will provide a packing by means of which any contact between the depolarizing mass and the zinc anode 6 is precluded. Further, the said paper sheet 8 projects the flange 2 and overhangs the peripheral space 7.

The cathode of the battery cell consists of a sheet 9 of a carbonaceous material which is impervious to chemicals. Owing to the flexibility of the said sheet, it will adhere in substantially perfect engagement with the lower side of the mass of depolarizing material and with the top side of the zinc cup providing the anode of the battery cell next below (see Fig. 5). Moreover, the said sheet 9 adheres to the under side of frame 1, which is flush with the lower face of the depolarizing mass.

Whenever electrolyte happens to ooze out of a battery cell constructed as described hereinbefore, said electrolyte will gather in the peripheral space 7 and thereby be prevented from getting into contact with the next battery cell and building a short-circuit therewith. The result is that such a cell can be used for the generation of considerably heavier currents than cells of the same size known heretofore.

Figure 5:
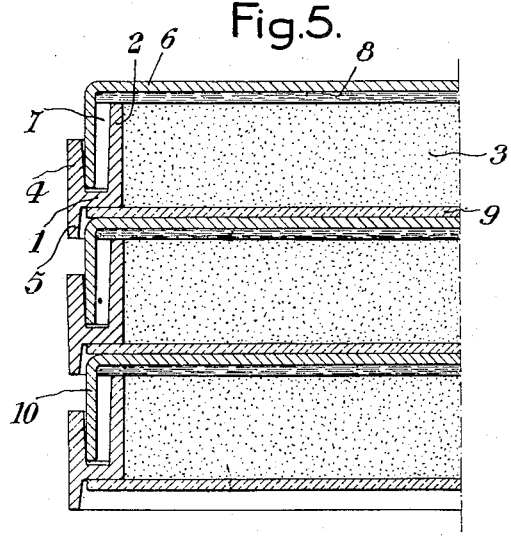
Figure 5 shows a plurality of battery cells boxed in one another.

In addition, battery cells constructed as described afford considerable advantages in the matter of assembling their parts to a whole cell and a number of cells to a whole battery. This results from the fact that the zinc cap providing the anode 6 is correctly positioned since the flange 10 of the same engages the inside of the outer flange 4 of the frame 1 throughout its periphery while the flange 5 of said frame 1 fits and caps the bottom of the inverted cup providing the anode 6 of the battery cell next below as shown in Fig. 5. Owing to the fact that the electrolytic paper sheet 8 extends over the whole peripheral chamber 7, not even a tiny portion of the depolarizing paste which fills the space 3 can get into contact with the anode 6, even if the said electrolytic paper sheet were not set in correct position; as a result of the aforesaid structural features, no special care has to be taken in assembling the cells and piling them up, which means that the whole manufacturing process can be carried out quite rapidly and therefore at much lower cost.

Moreover, in view of the fact that the height of the outer flange 4 of the frame 1 is less than that of the inner flange 2 on which the sheet 8 and the anode 6 are rested, a space is left between the frames of any two successive battery cells through which contact can be made from the outside between the anodes 6 with a view to test said battery cells.

What I claim is:

1. In a dry cell battery construction containing at least one cellular unit of a zinc anode, electrolyte, depolarizer and carbon cathode, in which each cell in a plurality of cells may be separately tested by contacting the sides of the successive zinc anodes, that arrangement comprising an outer insulating retaining frame having two parallel upwardly extending flange portions defining a ring-shaped trough therebetween, a downwardly extending flange under said frame adapted for receiving the upper part of the adjacent cell in fitting engagement therewith, a zinc anode having the shape of an inverted cup and having its peripheral flange received in the ring shaped trough in fitting engagement with the external upwardly extending flange portion of the frame, a layer of electrolyte between said zinc anode and the internal upwardly extending flange portion of the frame, a depolarizer in said frame and a carbon cathode layer under the frame and the depolarizer within the downwardly extending flange of the frame.

2. A plurality of unit cellular dry cells as in claim 1, wherein the zinc anode of one cell is in fitting engagement with the downwardly extending flange of the successive cell and has its upper face in contact with the lower face of the carbon cathode layer of said successive cell.

ROBERT PAILLET.

References Cited in the file of this patent

UNITED STATES PATENTS

| Number | Name | Date |
|---|---|---|
| 2,591,355 | Heraud | Apr. 1, 1952 |

FOREIGN PATENTS

| Number | Country | Date |
|---|---|---|
| 727,574 | Germany | Nov. 6, 1942 |